UNITED STATES PATENT OFFICE.

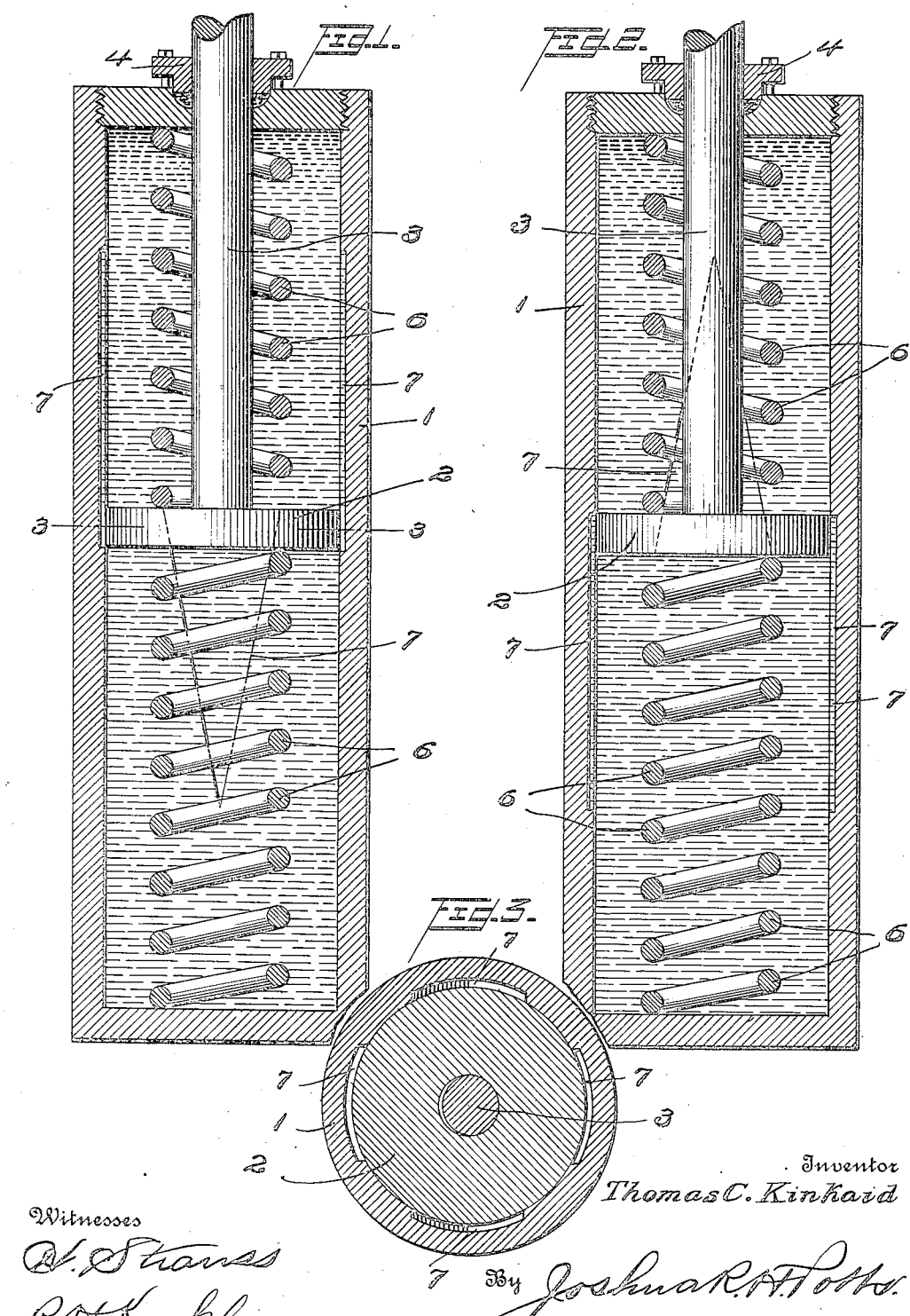

THOMAS C. KINKAID, OF PHILADELPHIA, PENNSYLVANIA.

SHOCK-ABSORBER.

1,112,705.  Specification of Letters Patent.  Patented Oct. 6, 1914.

Application filed October 12, 1912. Serial No. 725,374.

*To all whom it may concern:*

Be it known that I, THOMAS C. KINKAID, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a shock absorber comprising a cylinder having a movable piston therein, and form in the inner face of the cylinder, projecting in opposite directions from the normal position of the piston, triangularly shaped longitudinally disposed grooves, the wider ends of said grooves located at the normal position of the piston, and provide in said cylinder a fluid which by-passes through the grooves as the piston moves and which by-passes are reduced as the piston moves toward either end of the cylinder due to the triangular shape of said grooves.

A further object is to provide a shock absorber which is of extreme simplicity and which utilizes the action of springs and the by-passing of fluid, the resistance to the movement of the movable member increasing in proportion to the movement of the movable member away from the normal position of the same.

With these and other objects in view, the invention consists in certain novel features of construction and combinations and arrangements of parts as will be more fully hereinafter described and pointed out in the claim.

In the accompanying drawings: Figure 1 is a view in longitudinal section illustrating my improvements. Fig. 2 is a view in longitudinal section at right angles to Fig. 1, and Fig. 3 is a view in transverse section on the line 3—3 of Fig. 1.

1 represents a cylinder and 2 a piston snugly fitting the cylinder and mounted to reciprocate therein. A rod 3 is secured to the piston 2 and extends through a packing gland 4 in the end of the cylinder, it being understood, of course, that the cylinder is closed at both ends. The cylinder 1 contains a liquid filling the same, and on opposite sides of the piston coiled springs 6 are located bearing at one end against the piston and at their other ends against the ends of the cylinder, maintaining the piston normally in a position intermediate the ends of the cylinder. In the inner face of the cylinder and at both sides of the normal position of the piston, longitudinal triangular shaped grooves 7 are provided. The larger ends of all of these grooves are located at the normal position of the piston, and are cut off when the piston is in normal position. The piston must therefore move a slight distance before the by-pass begins, hence, the first or severe shock is utilized in very slightly compressing the fluid. It will also be noted that by this arrangement the by-pass is opened gradually. I have illustrated the grooves in one end of the cylinder, located at an angle of ninety degrees to the grooves in the other end of the cylinder, and this arrangement is a preferable one.

When the piston moves in either direction from the normal position illustrated, the fluid in one end of the cylinder must pass around the piston to the other end of the cylinder, and this is permitted by the grooves 7, so that the latter operate as liquid by-passes and such by-passes are of maximum size at the initial movement of the piston and gradually decrease as the piston moves in either direction away from its normal position, hence it will be noted that not only will the springs exert the greater pressure as the piston moves, but the resistance to the movement of the piston is augmented in just the proportion as the piston moves, so that the greater the movement, the greater the resistance, and hence a cushioning effect is had without jar or vibration. The piston returns to its normal position and is maintained in this normal position by the springs.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A device of the character described, comprising a cylinder constructed to contain fluid, and a piston movable in the cylinder, said cylinder having in its inner face two pairs of longitudinal grooves forming by-passes, said pairs of by-passes of least transverse area adjacent the ends of the cylinder and increasing in transverse area to their other ends, the larger ends of said by-passes all located at a point intermediate the ends of the cylinder and all overlying the circumference of the piston when the latter is in normal position, and said piston when in normal position covering the inner ends of said by-passes and closing communication through the same between the ends of said cylinder, substantially as described.

In testimony whereof I have signed my name to this specification in the presence of two subscribing witnesses.

THOMAS C. KINKAID.

Witnesses:
 CHAS. E. POTTS,
 R. H. KRENKEL.